United States Patent [19]

Patil et al.

[11] Patent Number: 5,232,615

[45] Date of Patent: Aug. 3, 1993

[54] HETEROCYCLIC NITROGEN COMPOUND MANNICH BASE DERIVATIVES OF POLYOLEFIN-SUBSTITUTED AMINES FOR OLEAGINOUS COMPOSITIONS

[75] Inventors: Abhimanyu O. Patil, Westfield; Robert D. Lundberg, Bridgewater, both of N.J.

[73] Assignee: Exxon Chemical Patents Inc., Linden, N.J.

[21] Appl. No.: 490,806

[22] Filed: Mar. 8, 1990

[51] Int. Cl.[5] .......................................... C10M 159/16
[52] U.S. Cl. ........................................ 252/50; 252/51; 544/180; 548/255; 548/309.7; 548/335.5; 548/362.5; 548/379.4
[58] Field of Search ................... 252/50, 51; 544/180; 548/335, 255

[56] References Cited

U.S. PATENT DOCUMENTS

| | | | |
|---|---|---|---|
| 3,632,600 | 1/1972 | Morris | 260/308 B |
| 3,788,993 | 1/1974 | Andress, Jr. | 252/51.5 A |
| 3,846,318 | 11/1974 | Lowe | 252/47.5 |
| 3,884,932 | 5/1975 | Andress, Jr. | 260/308 B |
| 3,897,351 | 7/1975 | Davis et al. | 252/34 |
| 4,148,605 | 4/1979 | Andress, Jr. | 422/7 |
| 4,153,564 | 5/1979 | Chibnik | 252/51.5 A |
| 4,212,754 | 7/1980 | Chibnik | 252/49.7 |
| 4,734,209 | 3/1988 | Phillips et al. | 252/47 |
| 4,820,776 | 4/1989 | Kapuscinski et al. | 525/279 |
| 4,855,074 | 8/1989 | Papay et al. | 252/51.5 A |
| 4,859,355 | 8/1989 | Chibnik | 252/47.5 |
| 4,897,086 | 1/1990 | Blain et al. | |
| 4,997,585 | 3/1991 | Frankenfeld et al. | 252/50 |
| 5,030,370 | 7/1991 | Patil et al. | 252/50 |
| 5,076,946 | 12/1991 | Frankenfeld et al. | 252/50 |

FOREIGN PATENT DOCUMENTS

| | | |
|---|---|---|
| 84021918 | 10/1975 | Japan . |
| 58052393 | 9/1981 | Japan . |
| 59-189195 | 4/1983 | Japan . |
| 60-194087 | 3/1984 | Japan . |
| 1061904 | 3/1967 | United Kingdom . |
| 1514359 | 6/1978 | United Kingdom . |
| 2069505 | 8/1981 | United Kingdom . |
| 2071139 | 9/1981 | United Kingdom . |

Primary Examiner—Jacqueline V. Howard
Attorney, Agent, or Firm—J. B. Murray, Jr.; R. A. Negin

[57] ABSTRACT

The novel polymers of the present invention are prepared by reacting a heterocyclic nitrogen compound containing at least one —N(H)— group in the ring, an aldehyde N-containing polymer adduct (e.g., an ashless nitrogen-containing dispersant or polyolefin-substituted amine) to form an oil soluble Mannich base derivative useful as dispersant, antiwear and antioxidant additive in oleaginous compositions such as lubricating oils and fuels. Preferred heterocyclic nitrogen compounds are azoles such as benzotriazoles and alkyl-substituted benzotriazoles. The polyolefin-substituted amine can comprises the reaction product of a polyamine and halogenated long chain hydrocarbons.

26 Claims, No Drawings

HETEROCYCLIC NITROGEN COMPOUND MANNICH BASE DERIVATIVES OF POLYOLEFIN-SUBSTITUTED AMINES FOR OLEAGINOUS COMPOSITIONS

FIELD OF THE INVENTION

The present invention relates to oil-soluble Mannich base materials useful as dispersant, antiwear and antioxidant additives for oleaginous compositions derived from polyolefin-substituted amines, aldehydes and heterocyclic nitrogen compounds.

BACKGROUND OF THE INVENTION

U.S. Pat. No. 3,632,600 relates to aliphatic-hydrocarbyl substituted heterocyclic nitrogen compounds useful as detergents and antioxidants for lubricant and fuel compositions, there being attached to a carbon atom or to a nitrogen atom of the heterocyclic ring a hydrocarbyl group having about 20-150 carbon atoms. The preparation of N-polyisobutenyl pyrrole, N-polyisobutenyl pyrazole and N-polyisobutenyl benzotriazole (from polyisobutenyl chloride and the corresponding heterocyclic compound, pyrrole, pyrazole and benzotriazole, respectively) is described.

U.S. Pat. Nos. 3,788,993 and 3,884,932 relate to hydrocarbon lubricant compositions containing the reaction product of an alkyl or alkenyl succinic anhydride and a benzotriazole or substituted benzotriazole which are reacted in mole ratios of from 1:1 to 1:2.

U.S. Pat. No. 3,846,318 relates to lubricating oil additives produced by the reaction of mercaptobenzothiazole, an aldehyde and a phenol, which may be alkylated with a $C_1$-$C_{24}$ alkyl group.

U.S. Pat. No. 3,897,351 relates to lubricant compositions containing an amine salt of the reaction product of an alkyl or alkenyl succinic anhydride and a benzotriazole or substituted benzotriazoles (employed in the mole ratio of from 1:1 to 1:2).

U.S. Pat. No. 4,148,605 relates to rust/corrosion inhibitors prepared by condensing a $C_8$ to $C_{28}$ alkenyl succinic anhydride with a $C_2$ to $C_{18}$ aliphatic hydroxy acid to form an ester-acid which can then be converted to amine salts. Suitable amines include triazoles such as benzotriazole and tolyl triazole.

U.S. Pat. No. 4,153,564 relates to additives for lubricants for fuels prepared by the reaction of an aromatic triazole, aldehyde and a product formed from alkenyl succinic anhydrides or acids and aniline-aldehyde resins. The product is disclosed to be characterized by —$CH_2$-triazole moieties as substituents to the aromatic groups of the aniline-aldehyde resin chains.

U.S. Pat. No. 4,212,754 relates to detergent and antiwear metal chelates prepared by (1) reacting a benzotriazole with a monoepoxide, (2) reacting the resulting hydroxyalkyl benzotriazole with an alkenyl succinic anhydride to form a monoester, and (3) converting the monoester to the salt of a metal which can form Werner complexes and complexing with a ligand-containing amine, hydroxyl, oxazoline or imidazoline groups to form the chelate.

U.S. Pat. No. 4,734,209 relates to metal deactivators formed by reaction between a triazole, formaldehyde and certain hydrocarbyl amines.

U.S. Pat. No. 4,820,776 relates to fuel oils and lubricants having improved properties containing ethylene-propylene copolymer bearing units derived from N-vinyl pyrrolidone and a second functional monomer which can comprise phenothiazines, imidazoles, benzimidazoles, thiazoles, benzothiazoles, triazoles, benzotriazoles, thiadiazoles, and other heterocyclic materials.

U.S. Pat. No. 4,855,074 relates to homogeneous additive concentrates useful in lubricating oils formed by heating a long chain succinimide and a benzotriazole in the presence of water, alkoxylated amines, dihydrocarbyl phosphites or dihydrocarbyl phosphites, and optionally also in the presence of a boronating agent and distilling the volatile components from the product.

U.S. Pat. No. 4,859,355 relates to a lubricant additive made by reacting a preformed Mannich base (prepared from a phenol, a $C_1$-$C_8$ alkyl aldehyde and a lower boiling point amine) in a displacement reaction with a reactive hydrocarbyl amine, thiol or dithiophosphoric acid having at least one reactive hydrogen. Amines suitable in the preformed Mannich base or in the displacement reaction are indicated to include benzotriazole and tolyltriazole.

U.K. Patent 1,061,904 relates to additives for lubricating compositions or hydraulic fluids prepared by reacting an imidazole or triazole with formaldehyde and a secondary mono-amine.

U.K. Patent 1,514,359 relates to additives for functional fluids prepared by reacting a monoamine, aldehyde and a compound which can comprise an alkaline-, cycloalkaline-, carbonyl-, sulphuryl-, —O-or —S-linked benzotriazole or benzimidazole. The monoamines are disclosed to include primary and secondary alkyl or alkenyl-substituted monoamines wherein the alkyl or alkenyl group has from 2-20 carbon atoms.

U.K. Patent Publication 2,069,505 relates to benzotriazole compositions prepared by reacting a benzotriazole and a water-insoluble aliphatic amine, of which tertiary alkyl primary amines and oil soluble basic nitrogen-containing dispersants (e.g., polyisobutenyl succinimides) are preferred.

U.K. Patent Publication 2,071,139 relates to sulfurized olefin compositions comprising (A) at least one benzotriazole or a benzotriazole-aliphatic amine reaction product and (B) a sulfurization product of at least one aliphatic or alicyclic $C_3$-$C_{30}$ olefinic compound. The benzotriazole-aliphatic amine reaction product can be derived by reacting a benzotriazole with primary, secondary or tertiary monoamines, with polyamine, or with an oil-soluble basic nitrogen-containing dispersant.

Japanese Patent Publications 58-52,393; 59-189,195; 60-194,087 disclose the preparation of additives for lubricating oils prepared by reacting an aldehyde, a monoamine and either benzotriazole or alkyl-substituted derivatives of benzotriazole.

Japanese Patent 84-021918 (87 Chem. Abs. 120403b) relates to lubricating oils with improved corrosion inhibiting properties containing alkenyl succinimides and benzotriazole.

SUMMARY OF THE INVENTION

The novel polymers of the present invention are prepared by reacting at least one heterocyclic nitrogen compound containing at least one —N(H)— group in the heterocyclic ring, at least one aldehyde reactant and at least one nitrogen-containing polymer, such as polyolefin-substituted amines (e.g., polyisobutylene-substituted amines) to form an oil soluble Mannich base derivative useful as dispersant, antiwear and antioxidant additive in oleaginous compositions such as lubricating oils and fuels. Preferred heterocyclic nitrogen compound are azoles such as benzotriazoles and alkyl-substituted benzotriazoles.

The novel polymers are formed by a process which comprises: (a) providing a N-containing polymer adduct containing reactive amino groups formed by contacting an amine compound having at least two reactive amine moieties with at least one long chain hydrocarbon-substituted reactant in an amount and under conditions sufficient to form a N-containing polymer adduct, said long chain hydrocarbon-substituted reactant comprising halogenated long chain hydrocarbons; and (b) contacting said N-containing polymer adduct with at least one aldehyde and at least one heterocyclic nitrogen compound containing at least one —N(H)— group in the ring to form an oil soluble Mannich base derivative.

In one preferred embodiment, the present invention is directed to a polyolefin-substituted dispersant and antioxidant additive useful in oleaginous compositions formed by (a) reacting an amine compound having at least two reactive amine moieties (e.g., ammonia or a polyamine such as a polyalkylene polyamine) with a chlorinated long chain hydrocarbon comprising a chlorinated polyolefin of 300 to 10,000 number average molecular weight to form an N-containing polymer substituted adduct having reactive amine groups, and (b) contacting said N-containing polymer adduct with at least one aldehyde and at least one heterocyclic nitrogen compound containing at least one —N(H)— group in the ring, in an amount and under conditions sufficient to form an oil soluble Mannich base derivative.

The materials of the invention are different from the prior art because of their effectiveness and their ability to provide enhanced dispersancy and antioxidant properties. In fuels, the additives serve to minimize the degree of carburetor and fuel injector fouling from deposits.

DETAILED DESCRIPTION OF THE INVENTION

Amine Compound

As described below, the N-containing polymer adduct employed in the present invention is prepared by contacting a long chain hydrocarbon substituted reactant with an amine compound containing at least two (e.g., from 2 to 20), preferably at least 3 (e.g., from 3 to 15), and most preferably from 3 to 8, reactive nitrogen moieties (that is, the total of the nitrogen-bonded H atoms) per molecule of the amine compound. The amine compound will generally comprise at least one member selected from the group consisting of ammonia, organic primary monoamines and organic polyamines containing at least one primary amine group or at least two secondary amine groups per molecule. Generally, the organic amines will contain from about 2 to 60, preferably 2 to 40 (e.g., 3 to 20), total carbon atoms and about 2 to 12, preferably 3 to 12, and most preferably from 3 to 8 (e.g., 5 to 9) total nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

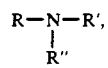

(I)

and

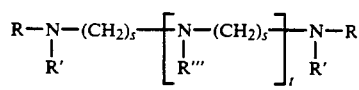

(II)

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

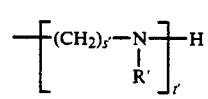

(III)

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', s, s', t and t' be selected in a manner sufficient to provide the compounds of Formulas I and II with typically at least one primary or secondary amine group, preferably at least two primary or secondary amine groups. This can be achieved by selecting at least one of said R, R', R" or R''' groups to be hydrogen or by letting t in Formula II be at least one when R''' is H or when the III moiety possesses a secondary amino group.

Non-limiting examples of suitable organic amine compounds include: 1,2-diaminoethane; 1,3-diaminopropane; 1,4-diaminobutane; 1,6-diaminohexane; polyethylene amines such as diethylene triamine; triethylene tetra; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N, N-di (2-hydroxyethyl) -1,3 -propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (IV):

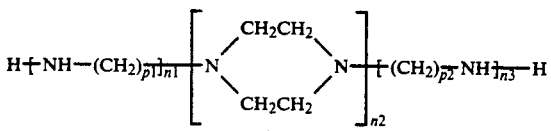

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetra, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

where m has a value of about 3 to 70 and preferably 10 to 35; and

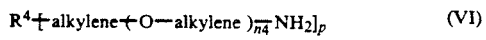

where "$n_4$" has a value of about 1 to 40 with the provision that the sum of all the $n_4$'s is from about 3 to about 70 and preferably from about 6 to about 35, and $R^4$ is a polyvalent saturated hydrocarbon radical of up to ten carbon atoms wherein the number of substituents on the $R^4$ group is represented by the value of "p", which is a number of from 3 to 6. The alkylene groups in either formula (V) or (VI) may be straight or branched chains containing about 2 to 7, and preferably about 2 to 4 carbon atoms.

The polyoxyalkylene polyamines of formulas (V) or (VI) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

The amine compound can comprise an amido-amine as described in U.S. Pat. No. 4,857,217, the disclosure of which is incorporated by reference in its entirety. Such amido-amines can be formed by reacting a polyamine with an alpha, beta-ethylenically unsaturated compound (e.g., of formula XXII), e.g., by reacting polyethylene amines (e.g., tetraethylene pentaamine, pentaethylene hexamine, and the like), polyoxyethylene and polyoxypropylene amines, e.g., polyoxypropylene diamine, trismethylolaminomethane and pentaerythritol, and combinations thereof, with an acrylate-type compound, and most preferably with an acrylate-type reactant selected from the group consisting of lower alkyl alkyacrylates (e.g., methyl, ethyl, iso-propyl, propyl, iso-butyl, n-butyl, tert-butyl, etc., esters of methacrylic acid, acrylic acid, and the like).

Exemplary of such amido-amines are compounds of the formula:

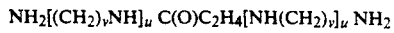

wherein u is an integer of from 1 to 10, and v is an integer of from 2 to 6.

Most preferred as the amine compound are members selected from the group consisting of ammonia and organic diprimary amines having from 2 to 12 carbon atoms and from 2 to 8 nitrogen atoms per molecule. Examples of such preferred organic diprimary amines are ethylene diamine, propylene diamine, diethylene triamine, dipropylene triamine, triethylene tetraamine, tripropylene tetraamine, tetraethylene pentaamine, tetrapropylene pentaamine, polyhexamethylene diamine, phenyl diamine.

PREPARATION OF LONG CHAIN HYDROCARBYL SUBSTITUTED REACTANT

The long chain hydrocarbyl reactants employed to form the improved dispersants of this invention include halogenated long chain aliphatic hydrocarbons such as those shown in U.S. Pat. Nos. 3,275,554, 3,438,757, 3,565,804, and 4,000,353 (the disclosures of which are hereby incorporated by reference in their entirety) wherein the halogen group on the halogenated hydrocarbon is displaced with the nitrogen-containing compound in the subsequent reaction therewith.

Preferred olefin polymers for halogenation to form reactant A are polymers comprising a major molar amount of $C_2$ to $C_{10}$, e.g., $C_2$ to $C_5$, monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the formation of reactant A will have number average molecular weights within the range of about 300 to 10,000, generally from about 700 and about 5,000, preferably from about 1000 to 4,000, more preferably between about 1300 and about 3,000. Particularly useful olefin polymers have number average molecular weights within the range of about 1500 and about 3000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The olefin polymers will generally have a molecular weight distribution (the ratio of the weight average molecular weight to number average molecular weight, i.e., $\overline{M}_w/\overline{M}_n$) of from about 1.0 to 4.5, and more typically from about 1.5 to 3.0.

For example, a polymer of a $C_2$ to $C_5$ monoolefin, e.g., polyethylene, polypropylene or polyisobutylene, wherein the polymer has an average molecular weight within the range of from 600 to about 3,000, preferably from about 800 to about 2,500, is halogenated with either bromine or chlorine; preferably the latter. The halogen may be conveniently added as gaseous chloride, liquid bromine, or a hydrohalogen, e.g., HCl or HBr gas.

The amount of halogen introduced will depend on the particular hydrocarbon used, the desired amount of amine to be introduced into the molecule, the particular alkylene amine used, and the halogen used. The amount of halogen introduced will generally be in the range from about 1 to 5 halogen atoms per molecule, depending on the reactivity of the resulting halide. On a weight percent basis, the amount of halide will generally range from about 1 to 25, more usually from about 1 to 10.

The halogenation step may be conducted in the temperature range of from about ordinary ambient temperatures to about 120° C. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 120° C.

The halohydrocarbon and amine compound (e.g., alkylene polyamine or polyalkylene polyamine) may be brought together neat or in the presence of an inert solvent, particularly a hydrocarbon solvent. The inert hydrocarbon solvent may be aliphatic or aromatic. Also, aliphatic alcohols may be used by themselves or in combination with another solvent, when capable of dissolving the reactants.

The reaction may be carried out at room temperature (20° C.), but elevated temperatures are preferred. Usually, the temperature will be in the range of from about 100° to 225° C. Depending on the temperature of the reaction, the particular halogen used, the mole ratios and the particular amine, as well as the reactant concentrations, the time may vary from 1 to 24 hours, more usually from about 3 to 20 hours. Times greatly in excess of 24 hours do not particularly enhance the yield and may lead to undesirable degradation. It is therefore preferred to limit the reaction time to fewer than 24 hours.

The mole ratio of halohydrocarbon to amine compound will generally be in the range from about 0.2 to 10 moles of amine compound per mole of halohydrocarbon, more usually 0.5 to 5 moles of amine compound per mole of halohydrocarbon. The mole ratio will depend upon the amount of halogen present in the halohydrocarbon, the particular halogen and the desired ratio of hydrocarbon to amine compound.

Small amounts of residual halogen in the final composition are not deleterious. Generally, the residual halogen, as bound halogen, will be in the range of 0 to 10 weight percent of the composition. Small amounts of halogen may be present as the hydrohalide salt of the hydrocarbon substituted alkylene polyamines.

Generally, the hydrocarbons used will have aliphatic unsaturation. In particular instances, the amines may react in a way resulting in the elimination of hydrogen halide, introducing further aliphatic unsaturation into the hydrocarbon radical. Therefore, the hydrocarbon radicals usually will be olefinically unsaturated. However, the olefinic unsaturation does not significantly affect the utility of the product, and when available, saturated aliphatic halide may be used.

After the reaction has been carried out for a sufficient length of time, the reaction mixture may be extracted with a hydrocarbon medium to free the product from any low molecular weight amine salt which has formed. The product may then be isolated by evaporation of the solvent. Further separation from unreacted hydrocarbon or purification may be carried out as desired, e.g., chromatography.

PREPARATION OF THE N-CONTAINING POLYMER ADDUCT

Preparation of N-containing polymer adducts useful in the present invention can be illustrated as follows:

EXAMPLE A

PIB-Cl

Into a reaction flask is introduced 950 g. of polyisobutylene (approximate number average molecular weight=950) dissolved in 1,000 ml. of carbon tetrachloride. The mixture is stirred and chlorine is introduced at a rate of 235-250 ml. per minute, the temperature being maintained at 0° C. After the reaction mixture has taken up 51 g. of chlorine, the introduction of chlorine is terminated, the carbon tetrachloride is removed in vacuo and the chlorinated polyisobutylene isolated and analyzed. Analysis: wt. percent chlorine, 7.0.

EXAMPLE B

PIB-EDA

Into a reaction flask is charged 1,156 g. of chloropolyisobutylene of approximately 950 number average molecular weight chlorinated to 7.8 weight percent chlorine), 75 ml. of xylene and 330 ml. of ethylene diamine, followed by the addition of 330 ml. of n-butanol. The mixture is then raised to a temperature of 100° C. over one hour and the temperature is then raised to about 160° C. and maintained there for about 4½ hours. About 330 ml. of distillate is obtained while raising the temperature from 130° to 160° C. The reaction mixture is transferred to a separatory funnel with the aid of one liter of benzene, and the mixture is washed repeatedly first with a dilute aqueous solution of isopropyl alcohol, then with a dilute aqueous solution of a combination of isopropyl alcohol and butanol and finally with water. The volatile materials are then removed from a sample of the washed product by sparging with nitrogen to constant weight on a steam plate. Analysis: titrimetric equivalent wt., 806, equal to 1.74% N; wt. percent chlorine, 0.62.

1,434 g. or about half of the volatile solvents is removed from the main portion of the washed product. This solution containing about 25% volatile solvent (titrimetric equivalent weight =1,051) combined with 240 g. of a mixture of other materials prepared similarly to provide a final product having a titrimetric equivalent weight of 985, the product being polyisobutenyl ethylene diamine.

EXAMPLE C

PIB-EDA

Into a reaction flask is introduced 1,000 g. of chloropolyisobutene (polyisobutene of approximately 420 number average molecular weight chlorinated to approximately 8 weight percent chlorine), 270 ml. of ethylene diamine and 270 ml. of n-butanol. The mixture is heated gradually to 170° C. during 1½ hours; distillate is collected mainly between 130° C. and 160° C. The mixture is then heated for about 3 hours at 170° C. At the end of this time, 1,000 ml. of toluene and 250 ml. of methyl isobutyl carbonol are added and the mixture washed with dilute aqueous isopropyl alcohol followed by repeated washings with water. Some of the volatile solvents are then removed on a steam bath using a nitrogen stream. The combined products from two similar runs are then filtered, yielding 3,911 g. Analysis: titrimetric equivalent wt., 840, equal to 1.67 wt. percent N. Complete removal of volatile solvents from a small sample indicate the product contains about 40% solvents, i.e., toluene and methyl isobutyl carbinol.

EXAMPLE D

PIB-EDA

Following the procedure of Example C, 1,000 g. of chloropolypropylene (polypropylene of about number average 800 molecular weight chlorinated to about 6 weight percent chlorine) is reacted with 270 g. of ethylene diamine. The product as finished contains about 15% volatile solvents. Analysis: titrimetric equivalent wt., 1,080, equal to 1.3 wt. percent N.

EXAMPLE E

PIB-TEPA

Into a reaction flask is introduced 1,500 g. of chloropolyisobutylene (polyisobutylene of approximately 950 molecular weight chlorinated to 5.6 weight percent chlorine), 285 g. of alkylene polyamine having an average composition of tetraethylene pentamine and 1,200 ml. of benzene, the mixture is heated to reflux, followed by stripping off the benzene and heating the mixture at about 170° C. for about 4 hours. The mixture is then allowed to cool, diluted with equal volumes of mixed hexanes and absolute ethanol, heated to reflux and ¼ volume of 10 weight percent aqueous sodium carbonate added. The phases are separated, and the organic phase is washed with water, followed by removing the volatile materials in vacuo. Analysis: wt. percent N, 4.15; molecular weight (ThermoNam), 1,539.

EXAMPLE F

PIB-EDA

Following the procedure of Example C, 950 g. of chloropolyisobutylene (polyisobutylene of approximately 950 $\overline{M}_n$ chlorinated to 4.48 weight percent chlorine) is combined with 270 ml. of ethylene diamine (EDA) in 270 ml. of n-butanol. The product as finished contains about 20 percent volatile solvents. Analysis: titrimetric equivalent wt., 976, equal to 1.44 wt. percent N.

EXAMPLE G

PIB-NH$_2$

Into a high pressure bomb is introduced 1,200 g. of polyisobutenyl chloride (polyisobutylene of approximately 500 $\overline{M}_n$, chlorinated to 8 wt. percent chlorine) and 400 g. of liquid ammonia, the bomb sealed and heated at 150° C. with rocking for about 15 hours. After cooling, the pressure is vented and the reaction mixture taken up in mixed hexanes, water and alcohol. The organic phase is then washed with 500 ml. of 5 percent sodium hydroxide, followed by repeated washings with water. The solvents are then distilled off and the residue, which weighed 767 g., is filtered through Celite to recover the PIB-NH$_2$.

THE ALDEHYDE MATERIAL

The aldehyde reactants employed in preparing the novel materials of this invention will generally comprise formaldehyde or paraformaldehyde, although it will be understood that other aldehyde-group containing compounds, such a s $C_2$ to $C_{10}$ hydrocarbyl aldehydes (e.g., butyraldehyde, acetaldehyde, propionaldehyde, and the like) can also be employed. A preferred group of aldehyde materials are compounds of the formula: R"CHO, wherein R" is H, aliphatic hydrocarbon radical (e.g., having from 1 to 4 carbon atoms), or aromatic radical (e.g., having from 6 to 10 carbon atoms).

THE HETEROCYCLIC NITROGEN REACTANTS

The heterocyclic nitrogen reactants useful in present invention comprise heterocyclic compounds containing a 5- or 6- membered ring with one nitrogen hetero-atom or two or three adjacent nitrogen hetero-atoms, in which two adjacent carbon atoms of the heterocyclic ring may form part of a further 6-membered aromatic, heterocyclic or alicyclic ring system, wherein the heterocyclic compound contains at least one —N(H)— ring group. The heterocyclic compound can contain other hetero-atoms, usually O or S. Preferably, the heterocyclic ring is unsaturated.

The 6 membered ring system, part of which may be formed by two adjacent carbon atoms of the heterocyclic ring, can comprise an aromatic ring system, for example, a benzene ring or naphthalene ring system. This adjacent 6-numbered aromatic ring system can also comprise a heterocyclic ring and an ethylenically unsaturated alicyclic ring system.

The heterocyclic ring and the adjacent 6-numbered ring system may be substituted or unsubstituted. (Preferably substitution in such systems occurs on carbon-atoms of the ring). Suitable substituents comprise alkyl, alkaryl, aryl, aralkyl or alkenyl, such as alkyl groups of from 1-10 carbon atoms (methyl, ethyl, propyl, butyl, pentyl, decyl and the like), aryl are from 6-10 carbon atoms (such as phenol and naphthyl), alkaryl and aralkyl are from 7–10 carbon atoms (tolyl, xylyl, ethylphenyl, and the like) and alkenyl of 2–10 carbon atoms (such as ethenyl, propenyl, butenyl, decenyl, and the like). Suitable substituents also include polar substituents, provided that the polar substituents are not present in proportions sufficiently large to alter significantly the hydrocarbon character of the hydrocarbyl group. Such polar substituents are exemplified by chloro, bromo, keto, etheral, aldehydo or nitro. The upper limit with respect to the proportion of such polar substituents on the group is about 10 wt % based on the weight of the hydrocarbyl portion of the group. Such polar substituent containing groups are referred to as hydrocarbyl groups throughout this specification.

Preferred herein are heterocyclic compounds of the formula:

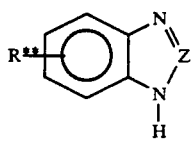

wherein Z is N, C(H) or C(R*), and R** is H, —OH, —Cl, —I or R*, wherein R* is $C_1$ to $C_{24}$ hydrocarbyl (most preferably $C_1$ to $C_3$ alkyl).

Exemplary of heterocyclic reactants useful in this invention are triazole, benzotriazole, 5-methyl benzotriazole, 5-ethyl benzotriazole, 5-butyl benzotriazole, 5-propyl benzotriazole, 5-dodecyl benzotriazole, 2-methyl benzotriazole, 2-ethyl benzotriazole, 2- butyl benzotriazole, 2-propyl benzotriazole, 2-dodecyl benzotriazole, 5,7-dimethyl benzotriazole, 5,7-diethyl benzotriazole, 5,7-dibutyl benzotriazole, 5,7-dipropyl benzotriazole, 5,7-didodecyl benzotriazole, naphthotriazole, 5-methyl naphthotriazole, 5-ethyl naphthotriazole, 5-butyl naphthotriazole, 5-propyl naphthotriazole, 5-dodecyl naphthotriazole, imidazole, 4-methyl imidazole, 4-ethyl imidazole, 4-butyl imidazole, 4-propyl imidazole, 4-dodecyl imidazole, 5-methyl imidazole, 5-ethyl imidazole, 5-butyl imidazole, 5-propyl imidazole, 5-dodecyl imidazole, benzimidazole, 5-methyl benzimidazole, 5-ethyl benzimidazole, 5-butyl benzimidazole, 5-propyl benzimidazole, 5-dodecyl benzimidazole, 2-methyl benzimidazole, 2-ethyl benzimidazole, 2-butyl benzimidazole, 2-propyl benzimidazole, 2-dodecyl benzimidazole, 5,7-dimethyl benzimidazole, 5,7-diethyl benzimidazole, 5,7-dibutyl benzimidazole, 5,7-dipropyl benzimidazole, 5,7-didodecyl benzimidazole, pyrrole, 3-methyl pyrrole, 3-ethyl pyrrole, 3-butyl pyrrole, 3-propyl pyrrole, 3-dodecyl pyrrole, 4-methyl pyrrole, 4-ethyl pyrrole, 4-butyl pyrrole, 4-propyl pyrrole, 4-dodecyl pyrrole, 5-methyl benzpyrrole, pyrazole, 5-methyl benzpyrazole, 5-ethyl benzpyrazole, 5-butyl benzpyrazole, 5-propyl benzpyrazole, 5-dodecyl benzpyrazole, 7-methyl benzpyrazole, 6-ethyl benzpyrazole, 7-butyl benzpyrazole, 6-propyl benzpyrazole, 7-dodecyl benzpyrazole, 5,7-dimethyl benzpyrazole, 5,7-diethyl benzpyrazole, 5,7-dibutyl benzpyrazole, 5,7-dipropyl benzpyrazole, 5,7-didodecyl benzpyrazole, 2-pyrroline, 3-pyrroline, 3-pyrazoline, carbazole, 5-methyl carbazole, indole, 3-methyl indole, 3-ethyl indole, 3-butyl indole, 3-propyl indole, 3-dodecyl indole, 4-methyl indole, 4-ethyl indole, 4-butyl indole, 4-propyl indole, 4-dodecyl indole, purine, phenothiazine, phenoxazine, perimidine, and the like.

Most preferred are benzotriazole and tolyltriazole.

PREPARATION OF THE MANNICH BASE DERIVATIVES

The amino-substituted polymer is reacted with the aldehyde and heterocyclic reactant in accordance with this invention by contacting in a reaction zone. The reactants are contacted for a time and under conditions effective to react the aldehyde, reactive amine groups of the amino-substituted polymer and the —N(H)— groups of the heterocyclic nitrogen reactant to form a Mannich Base condensation product containing heterocyclic nitrogen units bound to at least a portion of the amino-substituted polymer through a hydrocarbylene group derived from the aldehyde (e.g., a methylene (—CH₂—) group derived from formaldehyde).

The conditions of temperature and pressure under which the reaction occurs can vary widely, and generally temperatures of from about 0° to 200° C., preferably from about 25° to 150° C. Temperatures of less than 0° C. can be used but undesirably slow reaction rates can result. Reaction temperatures of greater than 200° C., up to the decomposition point of the reactants or reaction products, can also be employed, with the attendant formation of by-products. The pressures in the reaction zone will be sufficient to maintain a liquid reaction medium, and generally pressures from about 0.1 to 1000 kPa, and preferably from about 1 to 100 kPa, will be employed.

The reaction can be carried out in a batchwise, continuous or semicontinuous manner, in one or more reaction zones. The reaction can be conducted in any conventional apparatus such as stirred tank reactors, tubular flow reactors and the like.

The reactants can be charged to the reaction zone continuously or intermittently, together or sequentially, in any order. Generally, the amino-substituted polymer and any solvent for the reaction will be first charged to the reaction zone, followed by aldehyde reactant and then by addition of the heterocyclic nitrogen reactant, which can, if desired, be introduced to the reaction zone as a mixture of the aldehyde and heterocyclic nitrogen reactants. Preferably, the amino-substituted polymer is not contacted with the heterocyclic nitrogen reactant in the absence of the aldehyde reactant at reaction conditions.

The process of the present invention can be accomplished using a wide range of ratios of reactants, and the amino-substituted polymer:aldehyde reactant:heterocyclic nitrogen reactant will generally be charged in a ratio of from 1:0.01:0.01 to 1:50:50, and preferably from 1:0.2:0.2 to 1:10:10, and more preferably from 1:0.5:0.5 to 1:5:5, molar equivalents of amino-substituted polymer:moles of aldehyde reactant:moles of heterocyclic nitrogen reactant.

The reaction can be conducted in the absence, or in the presence, of a diluent or solvent for the amino-substituted polymer. Suitable solvents include mineral and synthetic lubricating oils, and hydrocarbon solvents such as aliphatics, cycloaliphatics, and aromatic hydrocarbon solvents, or halogenated versions of such solvents. The preferred solvents are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Most preferred are $C_{12}$ or lower straight-chain or branched-chain hydrocarbons particularly hexane. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The reaction time can vary widely, and will depend on such factors as the amount of reactants employed, the size of the reaction vessel, the temperature and other factors. Generally, the reaction time will range from about 0.5 to 48 hours, and more typically from 2 to 12 hours.

The heterocyclic nitrogen reactants are attached to one or more of the nitrogen atoms of the amino-substituted polymer through the residue of the aldehyde employed, e.g., —$CH_2$— in the case of formaldehyde. For polyisobutenyl-amine dispersants, this can be illustrated as follows:

PIB—NH—$(EtNH)_4$EtNH—PIB + $CH_2O$ +

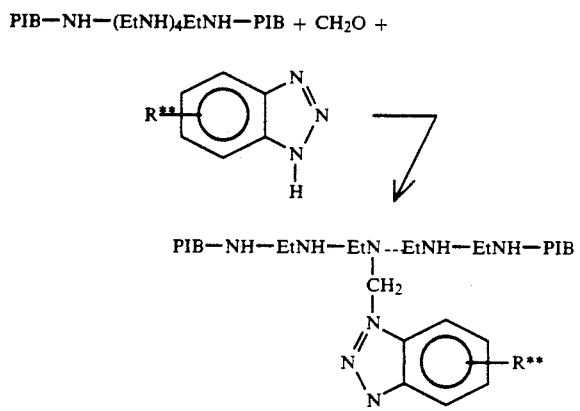

wherein "Et" represents the —$C_2H_4$— groups, "PIB" represents a polyisobutenyl group, and R** is as defined above.

Generally, from 25 to 100 wt. % (and preferably from 30 to 100 wt. %) of the N atoms in the amino-substituted polymer will be primary and/or secondary, and therefore reactive with the aldehyde and heterocyclic nitrogen reactants, and preferably at least about 1 wt. % of the reactive N atoms (e.g., from 1 to about 50 wt. %), and more preferably at least about 4 wt. % (e.g., from 4 to about 35 wt. %) of the reactive N atoms in the amino-substituted polymer will be reacted with the aldehyde and heterocyclic nitrogen reactant to form >N-ald-hetero N groups (wherein "ald" is the linking unit derived from the aldehyde reactant and "hetero N" is the residue of the heterocyclic nitrogen reactant).

The Mannich base derivatives of the amino-substituted polymers prepared by the process of this invention are soluble in common organic solvents and in mineral oils. The novel polymers of this invention are useful in oleaginous compositions as dispersant-viscosity index improver additives, as dispersant additives, and possess antioxidant and antiwear properties. The polymers of this invention are characterized by improved thermooxidative and thermal stability properties compared to the amino-substituted polymers from which they are prepared. The polymers of this invention also find utility in other applications such as thermoplastic systems, and are capable of being cast into coherent films, additives for conventional thermoplastics, and the like.

OLEAGINOUS COMPOSITIONS

The additives of the present invention can be incorporated into a lubricating oil (or a fuel in any convenient way. Thus, these mixtures can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures. Alternatively, the additives can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil (or fuel) to obtain the final formulation. Such additive concentrates will typically contain (on an active ingredient (A.I.) basis) from about 3 to about 45 wt. %, and preferably from about 10 to about 35 wt. %, of the additives of the present invention, and typically from about 30 to 90 wt. %, preferably from about 40 to 60 wt. %, base oil, based on the concentrate weight.

The additives of the present invention possess very good dispersant and antioxidant properties as measured herein in a wide variety of environments. Accordingly, the additives are used by incorporation and dissolution into an oleaginous material such as fuels and lubricating oils. When the additive mixtures of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pa. 19103. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of the invention. Such materials can be mixed with the hydrocarbon fuel in varying amounts of up to about 10–20% or more. For example, alcohols such as methanol, ethanol, propanol and butanol, and mixtures of such alcohols are included in commercial fuels in amounts of up to about 10%. Other examples of materials which can be mixed with the fuels include diethyl ether, methyl ethyl ether, methyl tertiary butyl ether, and nitromethane. Also within the scope of the invention are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiary-butyl-4-methylphenol, rust inhibitors, bacteriostatic agents, gum inhibitors, metal deactivators, upper cylinder lubricants and the like.

The additives of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants (especially ashless dispersants such as polyisobutylene succinimides and borated derivatives thereof), pour point depressants, antiwear agents, friction modifiers, etc., as described in U.S. Pat. No. 4,797,219, the disclosure of which is hereby incorporated by reference in its entirety. Some of these numerous additives can provide a multiplicity of effects, e.g., a dispersant-oxidation inhibitor. This approach is well known and need not be further elaborated herein.

In the preparation of lubricating oil formulations it is common practice to introduce the additives in the form of 10 to 80 wt. %, e.g., 20 to 80 wt. % active ingredient concentrates in hydrocarbon oil, e.g., mineral lubricating oil, or other suitable solvent. Usually these concentrates may be diluted with 3 to 100, e.g., 5 to 40 parts by weight of lubricating oil, per part by weight of the additive package, in forming finished lubricants, e.g., crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols an polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(-b 4-1 -methyl-2-ethylhexyl)silicate, tetra-(p-tertbutylphenyl) silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Refined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | 0.01-4 | 0.01-12 |
| Detergents | 0.01-3 | 0.01-20 |
| Corrosion Inhibitor | 0.01-1.5 | .01-5 |
| Oxidation Inhibitor | 0.01-1.5 | .01-5 |
| Dispersant | 0.1-8 | .1-20 |
| Pour Point Depressant | 0.01-1.5 | .01-5 |
| Anti-Foaming Agents | 0.001-0.15 | .001-3 |
| Anti-Wear Agents | 0.001-1.5 | .001-5 |
| Friction Modifiers | 0.01-1.5 | .01-5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

EXAMPLE 1

(a) To a reaction flask is introduced 500 g. of chloropolyisobutylene (polyisobutylene of approximately 2200 molecular weight chlorinated to 1.76 weight percent chlorine, i.e., 0.25 mole chlorine) and 36.2 g. of diethylene triamine (0.25 mole). The mixture is heated to 140° C. under a nitrogen blanket for 3 hours. The product is diluted with 300 ml heptane and reacted with 9.3 g. of calcium hydroxide. The product is filtered and the volatile materials from filtrate were removed in vacuo. Analysis: Wt. % N, 0.73.

(b) 50 g. of the amine-substituted polyisobutylene prepared as above is dissolved with stirring in 75 ml of tetrahydrofuran. A 1.6 ml solution containing formaline (37 wt %; 0.02 mole) is added to the above polymer solution, and then 2.62 g. (0.022 mole) of benzotriazole is added as a 5.24 wt % tetrahydrofuran solution. The mixture is stirred at room temperature for 12 hrs. The tetrahydrofuran solvent is removed from the product mixture on a rotating evaporator, and the resulting product is further dried under vacuum to give a clear polymer product.

The product polymer analyzes for 2.31 wt% total N, compared to the 0.73 wt % N in the amino-substituted polymer charged to the Mannich Base reaction zone. Infrared absorption spectra of the polymer product so obtained shows characteristic absorption peaks due to benzotriazole along with peaks due to the parent polymer. The polymer product is found to be soluble in tetrahydrofuran, hexane, and mineral lubricating oil (S100NLP).

The following lubricating oil compositions are prepared using the dispersant of Example 1(b) and comparative material comprising the amine-substituted polyisobutylene dispersant prepared as described in Example 1(a) above. The resulting compositions are tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test is a used crankcase mineral lubricating oil composition having an original viscosity of about 325 SUS at 38° C. that had been used in a taxicab that is driven generally for short trips only, thereby causing a buildup of a high concentration of sludge precursors. The oil that is used contains only a refined base mineral lubricating oil, a viscosity index improver, a pour point depressant and zinc dialkyldithiophosphate anti-wear additive. The oil contains no sludge dispersant. A quantity of such used oil is acquired by draining and refilling the taxicab crankcase at 1000–2000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separate out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that forms in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test is used to determine varnish inhibition. Here, each test sample consists of 10 grams of lubricating oil containing a small amount of the additive being tested. The test oil to which the additive is admixed is of the same type as used in the above-described SIB test. Each ten gram sample is heat soaked overnight at about 140° C. and thereafter centrifuged to remove the sludge. The supernatant fluid of each sample is subjected to heat cycling from about 150° C. to room temperature over a period of 3.5 hours at a frequency of about 2 cycles per minute. During the heating phase, gas which is a mixture of about 0.7 volume percent $SO_2$, 1.4 volume percent NO and balance air is bubbled through the test samples. During the cooling phase, water vapor is bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish imposed on the walls is rated to values of from 1 to 11 with the higher number being the greater amount of varnish, in comparison with a blank with no additive that is rated 11.

10.00 grams of SIB test oil are mixed with 0.05 grams of the products of the Examples as described in Table I and tested in the aforedescribed SIB and VIB tests. The data thereby obtained are summarized in Table 1 below.

TABLE 1

| Dispersant Example No. | Dispersant | Wt. % N (1) | SIB | VIB |
|---|---|---|---|---|
| 1 | PIB—NH$_2$—BZT Mannich Base | 2.31 | 4.72 | 7+ |
| Comp. A | PIB—NH$_2$ | 0.73 | 4.29 | 8 |
| BASE | None | — | 10.0 | — |

(1) Wt. % N in dispersant.

The above data thereby obtained show that the dispersants of this invention exhibit SIB/VIB performance and sludge and varnish inhibiting properties.

A crankcase lubricating oil formulation is prepared which contained 6 vol % of the novel dispersant formed in Example 1(b), together with mineral lubricating oil, a mixture of overbased Mg sulfonate detergent inhibitor and overbased Ca sulfonate detergent inhibitor, zinc dialkyl dithiophosphate antiwear agent, antioxidant and ethylene propylene viscosity index improver.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method for forming an oil soluble Mannich Base additive having dispersant and antioxidant properties which comprises:
   (a) reacting an amine compound having at least two reactive nitrogen moieties with a long chain hydrocarbon substituted reactant comprising at least one halogenated long chain hydrocarbon to form a N-containing polymer adduct, and N-containing polymer adduct having within its structure at least one primary or secondary amino group per polymer chain; and
   (b) contacting said N-containing polymer adduct with at least one aldehyde reactant and at least one heterocyclic reactant containing a 5- or 6-membered ring with one nitrogen hetero atom or two or three adjacent nitrogen hetero-atoms, in which two adjacent carbon atoms of the heterocyclic ring may form part of a further 6-membered aromatic, heterocyclic or alicyclic ring system, wherein the heterocyclic compound contains at least one —N(H)-group in the heterocyclic ring, to form said Mannich Base additive.

2. The process according to claim 1, wherein said amine compound comprises ammonia or at least one polyamine containing from 2 to 60 carbon atoms and from 2 to 12 nitrogen atoms per molecule.

3. The process according to claim 2, wherein said polyamine comprises a polyalkylenepolyamine wherein each said alkylene group contains from 2 to 6 carbons and said polyalkylenepolyamine contains from 5 to about 9 nitrogen atoms per molecule.

4. The process according to claim 1 wherein said amine compound comprises polyethylenepolyamine or polypropyleneamine.

5. The process according to claim 1 wherein said long chain hydrocarbon comprises polyisobutylene.

6. The process of claim 5, wherein said polyisobutylene has a number average molecular weight of from about 1,300 to 3,000.

7. The process according to claim 1 wherein said long chain hydrocarbon comprises ethylene-propylene copolymer.

8. The process according to claim 7 wherein said copolymer has a number average molecular weight of from about 3,000 to 10,000.

9. The process according to any of claims 1-8 wherein said heterocyclic reactant comprises at least one heterocyclic compound of the formula

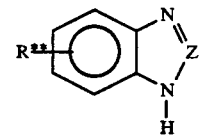

wherein Z is N, C(H) or C(R*) and R** is H, —OH, —Cl, —I or R* wherein R* is C$_1$ to C$_{24}$ hydrocarbyl.

10. The method of claim 9 wherein Z is N and R** is H, —OH, —Cl, —I or —R* wherein R* is C$_1$ to C$_3$ alkyl.

11. The method of claim 10 wherein said aldehyde is formaldehyde or paraformaldehyde.

12. The method of claim 11 wherein said heterocyclic reactant comprises benzotriazole or tolyltriazole.

13. An oil soluble dispersant and antioxidant additive which comprises a Mannich Base adduct of an N-containing polymer adduct, at least one aldehyde reactant and at least one heterocyclic reactant containing a 5- or 6-membered ring with one nitrogen hetero-atom or two or three adjacent nitrogen heteroatoms, in which two adjacent carbon atoms of the heterocyclic ring may form part of a further 6-membered aromatic, heterocyclic or alicyclic ring system, wherein the heterocyclic compound contains at least one —N(H)-group in the heterocyclic ring, said N-containing polymer adduct having within its structure at least one primary or secondary amino group per polymer chain and comprising the product of the reaction of an amine compound having at least two reactive nitrogen moieties with a long chain hydrocarbon substituted reactant comprising at least one halogenated long chain hydrocarbon.

14. The oil-soluble additive according to claim 13, wherein said amine compound comprises ammonia or at least one polyamine containing from 2 to 60 carbon atoms and from 2 to 12 nitrogen atoms per molecule.

15. The oil-soluble additive according to claim 14, wherein said polyamine comprises a polyalkylenepolyamine wherein each said polyalkylenepolyamine contains from 2 to 6 carbons and said polyalkylene polyamine contains from 5 to about 9 nitrogen atoms per molecule.

16. The oil-soluble additive according to claim 13, wherein said amine compound comprises polyethylenepolyamine or polypropyleneamine.

17. The oil-soluble additive according to claim 13, wherein said long chain hydrocarbon comprises polyisobutylene.

18. The oil-soluble additive of claim 17, wherein said polyisobutylene has a number average molecular weight of from about 1,300 to 3,000.

19. The additive according to claim 13, wherein said long chain hydrocarbon comprises ethylene-propylene copolymer.

20. The additive according to claim 19 wherein said copolymer has a number average molecular weight of 3,000 to 10,000.

21. The additive according to any of claims 13-20 wherein said heterocyclic reactant comprises at least one heterocyclic compound of the formula

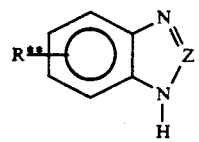

wherein Z is N, C(H) or C(R*) and R** is H, —OH, —Cl, —I or R* wherein R* is $C_1$ to $C_{24}$ hydrocarbyl.

22. The additive of claim 21 wherein Z is N, T is —N(H)— and R** is —OH, —Cl, —I or —R* wherein R* is H or $C_1$ to $C_3$ alkyl.

23. The additive of claim 22 wherein said aldehyde is formaldehyde or paraformaldehyde.

24. The additive of claim 23 wherein said heterocyclic reactant comprises benzotriazole or tolyltriazole.

25. A lubricating oil composition containing from about 0.1 to 20 wt. % of the additive prepared according to claim 1.

26. A lubricating oil composition containing from about 0.1 to 8 wt. % of the additive of claim 13.

* * * * *